United States Patent
Delson et al.

(10) Patent No.: US 11,085,634 B2
(45) Date of Patent: Aug. 10, 2021

(54) THERMAL SLUDGE TO ENERGY TRANSFORMER

(71) Applicant: GATE 5 ENERGY PARTNERS, INC., Irvine, CA (US)

(72) Inventors: Steven Delson, Laguna Hills, CA (US); Lawrence E. Dees, Jr., Aliso Viejo, CA (US)

(73) Assignee: GATE 5 ENERGY PARTNERS, INC., Irvine, CA (US)

( * ) Notice: Subject to any disclaimer, the term of this patent is extended or adjusted under 35 U.S.C. 154(b) by 483 days.

(21) Appl. No.: 14/074,370

(22) Filed: Nov. 7, 2013

(65) Prior Publication Data

US 2015/0121870 A1    May 7, 2015

(51) Int. Cl.
| | |
|---|---|
| F23G 5/04 | (2006.01) |
| F23G 5/12 | (2006.01) |
| F23L 15/04 | (2006.01) |
| F23G 7/00 | (2006.01) |
| F01K 7/16 | (2006.01) |

(Continued)

(52) U.S. Cl.
CPC ............. *F23G 5/04* (2013.01); *F01K 3/185* (2013.01); *F01K 7/16* (2013.01); *F23G 5/006* (2013.01); *F23G 5/12* (2013.01); *F23G 7/001* (2013.01); *F23L 15/04* (2013.01); *F26B 23/001* (2013.01); *F26B 23/028* (2013.01); *C10J 2300/0909* (2013.01); *C10J 2300/0923* (2013.01); *F23G 2206/10* (2013.01); *F23G 2206/203* (2013.01);

(Continued)

(58) Field of Classification Search
CPC ... F23G 5/04; F23G 5/46; F23G 7/001; F23G 7/10; F23G 7/105; F23G 2201/10; F23G 2206/203; F23G 2209/12

USPC ............ 60/643–681; 34/468–471, 478–479, 34/73–79
See application file for complete search history.

(56) References Cited

U.S. PATENT DOCUMENTS

| | | | | |
|---|---|---|---|---|
| 2,066,418 | A | * | 1/1937 | O'Mara ................ F23G 7/001 110/106 |
| 4,159,682 | A | * | 7/1979 | Fitch .......................... B01J 8/28 110/216 |

(Continued)

FOREIGN PATENT DOCUMENTS

WO    WO 2012067708 A3 *  3/2014  ............... F23G 5/04

OTHER PUBLICATIONS

International Search Report received for PCT Patent Application No. PCT/US2013/068882, dated Apr. 14, 2014, 3 pages.

(Continued)

*Primary Examiner* — Laert Dounis
(74) *Attorney, Agent, or Firm* — One LLP; Joseph K. Liu (57) ABSTRACT

Systems and processes provide for a thermal process to transform sludge (and a variety of other natural waste materials) into electricity. Dewatered sludge and other materials containing a high amount of latent energy are dried into a powdered biofuel using a drying gas produced in the system. The drying gas is recirculated and is heated by the biofuel produced in the system, waste heat (from turbines or internal combustion engines), gas (including natural gas or digester gas) and/or oil. The biofuel is combusted in a boiler system that utilizes a burner operable to burn biofuel and produce heat utilized in a series of heat exchangers that heat the recirculating drying air and steam that powers the turbines for electricity production.

11 Claims, 5 Drawing Sheets

Block Diagram of Treatment System 100

(51) Int. Cl.
    *F01K 3/18*           (2006.01)
    *F23G 5/00*           (2006.01)
    *F26B 23/00*          (2006.01)
    *F26B 23/02*          (2006.01)

(52) U.S. Cl.
    CPC .......... *F26B 2200/18* (2013.01); *Y02E 20/12* (2013.01); *Y02E 20/34* (2013.01)

(56) References Cited

U.S. PATENT DOCUMENTS

| | | | | | |
|---|---|---|---|---|---|
| 4,232,614 | A | * | 11/1980 | Fitch | F23G 5/04<br>110/224 |
| 4,290,269 | A | * | 9/1981 | Hedstrom | F23G 5/04<br>110/221 |
| 4,414,813 | A | | 11/1983 | Knapp | |
| 5,215,670 | A | * | 6/1993 | Girovich | F26B 1/00<br>209/659 |
| 6,138,381 | A | * | 10/2000 | Abyhammar | F26B 23/001<br>34/468 |
| 7,272,934 | B2 | | 9/2007 | Chandran et al. | |
| 2011/0259010 | A1 | * | 10/2011 | Bronicki | F22B 3/04<br>60/651 |
| 2013/0019529 | A1 | | 1/2013 | Song et al. | |

OTHER PUBLICATIONS

International Preliminary Report on Patentability received for PCT Patent Application No. PCT/US2013/068882, dated May 19, 2016, 6 pages.

International Written Opinion received for PCT Patent Application No. PCT/US2013/068882, dated Apr. 14, 2014, 4 pages.

* cited by examiner

Figure 1: Block Diagram of Treatment System 100

Figure 2: Block Diagram of Treatment System 200

Figure 3: Block Diagram of Treatment System 300

Figure 4 – Block Diagram Process 400

Figure 5 – Computing System 500

THERMAL SLUDGE TO ENERGY TRANSFORMER

BACKGROUND

1. Field

This application relates generally to processing of waste into energy, specifically the production of electrical and thermal energy from semi-solid waste materials containing organic solids and, more specifically, to processing municipal sewage sludge, agricultural and food waste, as well as other natural waste materials (hereinafter referred to as "sludge") into energy.

2. Related Art

Sludge management and production of energy without consuming fossil fuel are world-wide issues that can pose significant economic, health, and environmental challenges. Sludge is typically disposed of on land; the degree to which it must be stabilized before this land disposal varies significantly by jurisdiction. Sludge is known to contain harmful pathogens and bacteria, and naturally decomposes into methane-containing gasses and compounds containing nitrates and phosphorus; sludge can be both an environmental and public health problem. Sludge can, however, be viewed as a resource instead of waste because it contains significant latent energy. This latent energy is also referred to as "calorific value" and is measured in BTUs (British Thermal Units). An emerging practice at wastewater treatment plants is to utilize a portion of the energy in sludge by capturing and burning portions of the methane-containing gasses that are a byproduct of anaerobic digestion (leaving the remnant, digested sludge, to be managed offsite). As much as 50 percent of the calorific value in sludge can be released through anaerobic digestion. Many systems and processes have been developed to safely and economically manage the sludge that remains at the end of the wastewater treatment process. In general, systems and processes are designed to remove moisture from the sludge before it is released into the environment. The moisture removed from the sludge (referred to herein as "wastewater") is generally returned to the headworks of the wastewater treatment plant for processing. For the most part the energy in the sludge that remains at the end of the treatment process is an unused resource.

Sludge, regardless of its origin, can be categorized based on the treatment that it has undergone. For example, sludge that has not yet been stabilized through decomposition by anaerobic bacteria is referred to as "undigested sludge," while sludge that has been decomposed by anaerobic bacteria is referred to as "digested sludge." Typically, undigested municipal sewage sludge and raw/fresh animal or food stock waste has a relatively high calorific value, while digested municipal sewage sludge and aged animal or food stock waste typically have lower calorific value in comparison.

A number of methods have been developed for transforming the latent energy in sludge into usable energy; some of the methods are combustion, gasification, pyrolysis, and thermal hydration. These methods, historically, reduce rather than eliminate the amount of sludge that requires land disposal and will not generate the thermal or electrical energy needed for the process to run without gird electricity and/or fossil fuel.

Thus, systems and processes for the elimination of sludge that can also generate an adequate amount of electrical and thermal energy to sustain the process are desired.

SUMMARY

In some examples, a system to produce energy from sludge may include a heater, a dryer with a grinder and/or mill ("Dryer"), a system boiler, and a turbine, or any combination thereof. The Dryer is operable to receive high-temperature gas and sludge, and reduce the moisture content of the sludge and break the sludge into a dried powder (referred to herein generally as "biofuel") in the presence of the high-temperature gas, wherein the high-temperature gas absorbs at least a portion of the moisture content of the sludge to become at least partially-saturated gas. The system may include a conveyance for a re-circulating stream of the high-temperature gas ("drying gas") to transform the sludge into biofuel using heat from one or any combination of the following sources: digester gas or a form of natural gas combusted in a gas-fueled heater, biofuel combusted through a burner within the system boiler, and/or exhaust heat from turbines or internal combustion engines. The system may include a first separator operable to separate the biofuel from the at least partially saturated drying gas and either a condenser operable to reduce a moisture content of the at least partially saturated drying gas by reducing the temperature below the dew point of the at least partially saturated gas or a diverter to divert a portion of the at least saturated drying gas containing the amount of moisture evaporated from the sludge, becoming a reduced-moisture drying gas. The system may include the following components to reheat the reduced-moisture drying gas into a re-circulating stream of drying gas: the above described gas-fueled heater, a first primary heat exchanger operable using heat from the combusted biofuel, and/or a second primary heat exchanger operable using exhaust heat from turbines or internal combustion engines. The system may also include: a first fan operable to direct a portion of the re-circulating stream of drying gas heated by the gas-fueled heater to the Dryer, and/or a second fan operable to direct a portion of the circulating stream of drying gas heated in the system boiler to the Dryer and/or a third fan operable to direct a portion of the circulating stream of drying gas heated from the exhaust air to the Dryer.

In one exemplary embodiment, portions of heat from the system boiler may be conveyed to the turbine generator system instead of the Dryer. A third primary heat exchanger may convey heat from the system boiler to the turbine generator system and power may be generated for running the system and for other uses.

In some examples, the system boiler may include a burner operable to burn a mixture of ambient or preheated air and at least a portion of the biofuel as fuel. This burner may be further operable to burn an oil or gas, separately or in combination with biofuel.

In some examples, the first condenser may be operable to receive water or oil at a first temperature, the water or oil to be used to reduce the temperature of the at least partially saturated drying gas, wherein the first condenser may be further operable to output the water or oil at a second temperature that is higher than the first temperature. The water or oil at the second temperature can be used for power or combined heat and power ("CHP") generation or other purposes. In some examples, the system may include a storage tank operable to store the water or oil after being used for power or CHP generation or other purposes, wherein the first condenser is coupled to receive water or oil from the storage tank, although this water or oil may come from any source and be used for any purpose or no purpose.

In some examples, the system boiler's exhaust system includes a second separator operable to separate at least a portion of ash byproduct of the combustion of the biofuel in the system boiler, wherein the second separator is further operable to discharge this ash from the system. The exhaust system may further include a second condenser operable to reduce a moisture content of the combusted air from the system boiler to form a reduced temperature combusted gas. The exhaust system may further include another fan operable to discharge the reduced temperature combusted gas to the system pollution control equipment and ultimately to the atmosphere.

In other exemplary embodiments, processes and computer-readable storage mediums are provided for processing sludge using the systems described above.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Figure 1:
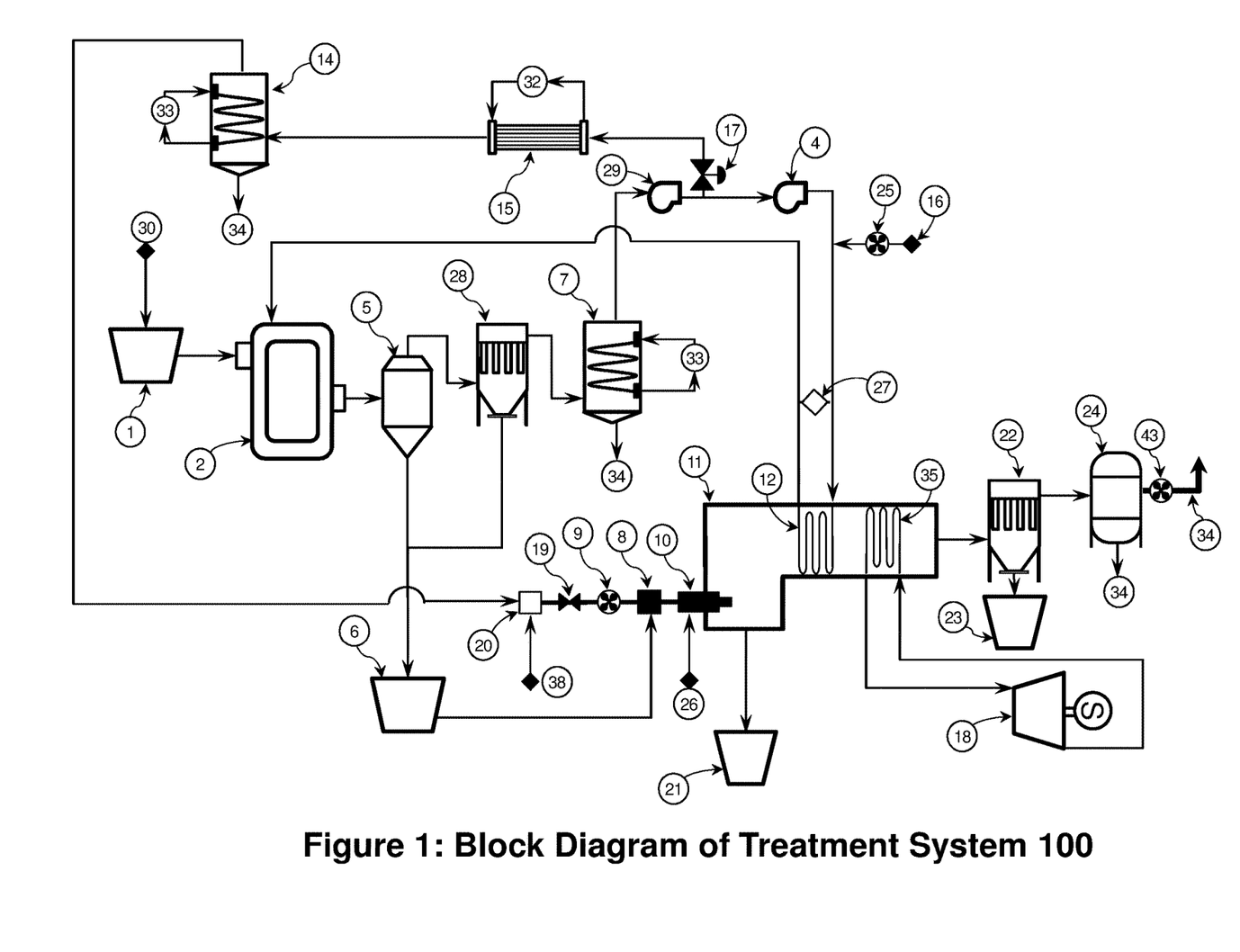
FIG. 1 illustrates a block diagram of an exemplary system for transforming sludge into energy.

FIG. 1 illustrates a block diagram of an exemplary treatment system 100. As an overview, treatment system 100 may be used to produce power from sludge by converting sludge 30 into biofuel that is combusted to produce heat used in the system for the production of both biofuel and power. In treatment system 100 the drying gas receives its heat from air-air boiler heat exchanger 12 within boiler 11.

Treatment system 100 may include a storage unit 1 for holding sludge 30 brought into the system. In some examples, storage unit 1 may be used to store sludge that has been dewatered to have approximate 40 to 85 percent moisture content at ambient temperature (i.e. "dewatered sludge"). However, it should be appreciated that sludge having other content ratios may be used. Storage unit 1 may include any type of standard storage system suitable for storing sludge. The volume of storage unit 1 may depend on the location of treatment system 100 and the sludge source. For instance, if treatment system 100 is situated at a municipal wastewater treatment plant or large-scale agricultural or food processing operation with an adequate continuous supply of sludge and onsite dewatering, storage unit 1 may be used only as a surge bin having a two to three hour sludge capacity. If, however, the treatment system 100 is at a facility where the supply of sludge is not consistently available for efficient operation of the system on a continuous basis, be it at a treatment plant, food processing facility, hog farm, cattle ranch, farm, or dairy with sludge being trucked in from other sites, storage unit 1 may have a volume allowing storage of a 24-hour or more running capacity of dewatered sludge. However, it should be appreciated that, irrespective of the examples cited, a storage unit 1 having any desired capacity may be used.

Treatment system 100 may further include a dryer that includes a grinder, and/or mill (or combination thereof), hereinafter referred to as a Dryer 2 in which the moisture may be reduced or removed from the sludge that has been dewatered (either at the treatment site or offsite dewatering equipment of any sort may be included in the system in advance of the storage unit 1). The Dryer 2 may also be used to process the dewatered sludge to a uniform, or at least substantially uniform, size (becoming biofuel after drying and processing). The Dryer 2 may be of any design that is able to pulverize the dewatered sludge into a fine powder, e.g., 80% of which would be smaller than 80 microns and can pass through a #200-sieve screen, and with a moisture content of less than about 30 percent. In some examples, Dryer 2 may be of a size operable to process on the order of 60 wet tons of dewatered sludge (40%-85% moisture) over a 24-hour period by drying and milling or grinding the dewatered sludge as described above. However, Dryer 2 may be of any greater or lesser capacity (size) and the system may reduce the moisture of the sludge to any amount.

It should be appreciated that the operating temperature of the high-temperature gas at Dryer 2 may vary depending on the specific sludge application. Increasing the temperature of drying gas stream in Dryer 2 enables increased moisture pickup per unit weight of sludge. As a result, the throughput of Dryer 2 for dewatered sludge of any particular moisture content may be increased in proportion to heat input to the Dryer 2. In one example, the drying gas stream coming to the Dryer 2 is received at a temperature between 600° F. and 1,500° F. In this example, the source of heat for drying gas stream coming to Dryer 2 is an air-air boiler heat exchanger unit 12 within system boiler 11. As will be described in greater detail below, mixer 27 may divert a portion of the portion of the now cleaned drying gas stream not drawn through diverter valve 17 into the drying gas stream exiting air-air boiler heat exchanger 12 in order to produce the drying gas stream of the desired temperature for Dryer 2. Due to the evaporative cooling that occurs within Dryer 2, the temperature of the drying gas stream entering Dryer 2 will be reduced before exiting Dryer 2. The drying gas stream entering Dryer 2 absorbs moisture from the sludge and exits as an at least partially saturated drying gas stream.

The sludge 30 may be transferred from storage unit 1 to Dryer 2 using any means that is capable of delivering an accurate, modulated supply of sludge to the Dryer 2. For example, an auger capable of delivering previously dewatered, but otherwise wet, sludge may be used to supply Dryer 2.

Treatment system 100 may include gas-solids separator 5 for separating particulate from the at least partially saturated drying gas stream exiting from Dryer 2. Gas-solids separator 5 may be configured to remove the biofuel from the at least partially saturated drying gas stream carrying the sludge moisture from Dryer 2. In some examples, the temperature of the mixture of biofuel and at least partially saturated drying gas stream from Dryer 2 may be at approximately 300° F. However, it should be appreciated that this temperature can vary depending on the system application or design. Gas-solids separator 5 may be configured to separate the biofuel from the at least partially saturated drying gas stream and deposit the biofuel in a biofuel bin 6. In some examples, gas-solids separator 5 may be made from a material capable of withstanding high gas temperatures and corrosive materials, such as stainless steel or other appropriate materials, and may be operable to remove at portion of the biofuel from the at least partially saturated drying gas stream. Separator may also include a fabric-type gas-solids separator (baghouse) 28 to separate the remaining solids from the at least partially saturated drying gas stream.

In some examples, gas-solids separator 5 may be a cellular-type separator. In these examples, the inlet to each individual cell may be fitted with a multiple blade spinner arranged to spin the at least partially saturated drying gas stream and convey the particles to the outlet of the cell. The particles may, for example, be deposited into biofuel bin 6 via a rotary valve or any other means (not shown). The at least partially saturated drying gas stream is at least partially cleaned by separator 5 and fabric-type gas-solids separator 28 and enters condensing-type scrubber 7 as partially cleaned at least partially saturated drying gas stream. The partially cleaned at least partially saturated drying gas stream passes through condensing-type scrubber 7 where its moisture content is reduced and exits as a cleaned drying gas stream.

As mentioned above, once separated from the at least partially saturated drying gas stream, the biofuel may be sent to biofuel bin 6. Additionally, as described in greater detail below, in some examples, biofuel bin 6 may include an auger that meters the biofuel into a mix box 8 where it is combined with ambient and/or preheated air and then used by dual fuel burner 10 and combusted in the system boiler 11. It should be appreciated that any delivery rate or biofuel to air mixture may be used depending on the objectives of the system. In some examples, biofuel bin 6 may include a safety system to prevent dust explosions. The safety system for biofuel bin 6 may reduce the possibility of dust explosions by, for example, injecting an inert gas, such as nitrogen or carbon dioxide, into biofuel bin 6.

Treatment system 100 may further incorporate a bottom ash collection system in system boiler 11. The bottom ash collection feature may further gravity feed a separate or integral ash storage bin 21.

Treatment system 100 may further include a process fan 29 to draw a vacuum to pull the at least partially saturated drying gas stream through gas-solids separators 5 and 28, and condensing-type scrubber 7 and to diverter valve 17 in order to divert a portion of the now cleaned drying gas stream from the drying gas loop through gas-water heat exchanger 15. Heat exchanger 15 cools the diverted portion of cleaned drying gas stream using process water from an ambient-temperature water source 32 and condenses out a volume of moisture equal to the moisture contained in sludge 30 from the diverted portion of cleaned drying gas stream via condenser 14. Prior to reaching condenser 14, heat drawn from the diverted portion of the cleaned drying gas stream by gas-water heat exchanger 15 may be used as the source of heat for heating the plant digesters or other Combined Heat and Power (CHP) out-of-system uses 32 (not shown) or for no use. In some examples, process fan 29 and diverter valve 17 may be made from temperature and corrosion-tolerant materials, such as stainless steel or other appropriate materials. Diverter valve 17 functions to keep an overall moisture balance in the drying gas loop by diverting a portion of cleaned drying gas stream carrying a volume of moisture equal to that absorbed from the sludge less the volume of moisture removed by condensing-type scrubber 7.

Treatment system 100 may further include make-up air supply 16 to replace the amount of the cleaned drying gas stream diverted from the drying gas loop by diverter valve 17. It should be appreciated that make-up air supply 16 may be ambient temperature or preheated. Make-up air supply 16 may include air supply fan 25. It should be appreciated that make-up air supply 16 can be located before or after process-air circulation fan 4.

As mentioned above, treatment system 100 may further include a condenser 14 for condensing moisture from the diverted portion of cleaned drying gas stream. In some examples, this diverted portion of cleaned drying gas stream may be at a temperature above its dew point. The shell of condenser 14 may be made from a high-temperature and corrosion-tolerant material, such as stainless steel or other appropriate materials. Heat in the diverted portion of the cleaned drying gas stream will be transferred through heat exchanger 15 to process water circulated through heat exchanged 15 using a re-circulating water system (not shown) that will convey the heat to out-of-system uses. The diverted portion of cleaned drying gas stream passing through heat exchanger 15 will be conveyed to condenser 14 that will then, utilizing process water from an ambient-temperature water source 33, reduce the temperature of the diverted portion of the cleaned drying gas stream to below its dew point. The moisture in the diverted portion of cleaned drying gas stream may be recovered by lowering the temperature of this gas stream to below its dew point by, for example, using the process water from an ambient-temperature source, thereby causing the moisture to condense out of the diverted portion of cleaned drying gas stream. As the moisture condenses into water, it may collect carry-over particulate remaining in the gas stream and carry the particulate as sludge condensate 34 which is to be removed from the system and conveyed to the treatment plant or other out-of-system treatment (not shown). A reduced-temperature diverted portion of cleaned drying gas stream exits condenser 14 and is conveyed to primary air supply inlet 20 at system boiler 11 where it will be serve as a portion of the combustion air utilized with the biofuel from biofuel bin 6 and combusted utilizing duel fuel burner 10. Additionally, after the aforementioned process water used to cool the diverted portion of cleaned drying gas stream into condensate, as described above, is warmed and may be either returned to ambient-temperature water source 33, or used for any purpose when it exits condenser 14.

Treatment system 100 may further include process-air circulation fan 4 for drawing the portion of cleaned drying gas stream from condensing-type scrubber 7 that was not diverted by diverter valve 17 and circulating it to the air-air boiler heat exchanger unit 12 within system boiler 11. In some examples, process-air circulation fan 4 may be made from temperature and corrosion-tolerant materials, such as stainless steel or other appropriate materials, and may circulate 100 percent of the weight of gas that passes through treatment system 100. Process-air circulation fan 4 may include a speed control that may be adjusted based on the characteristics of the sludge fed to Dryer 2. While shown at the output of condensing-type scrubber 7, it should be appreciated that process-air circulating fan 4 may be combined with process fan 29 or located at the output of any of Dryer 2, gas-solids separators 5 and 28, or condensing-type scrubber 7.

Treatment system 100 may further include mixer 27 that may divert a portion of the portion of the now cleaned drying gas stream not drawn through diverter valve 17 into the drying gas stream exiting air-air boiler heat exchanger 12 in order to produce a drying gas stream of the desired temperature for Dryer 2. In some examples, mixer 27 may be made from temperature and corrosion-tolerant materials, such as stainless steel or other appropriate materials, and may divert up to 100 percent of the weight of gas that passes through treatment system 100.

As mentioned above, dual fuel burner 10 will be used to produce heat for Dryer 2 operation and/or to produce steam for the steam system/turbine 18. The dual fuel burner 10 may utilize any single or a combination of multiple fuels. The primary source may be biofuel supplied from biofuel bin 6. The secondary source may be a supplementary fuel 26, such as gas (e.g., digester gas, natural gas, propane, and the like) or oil. The flow rate of fuel supplied to dual fuel burner 10 may be controlled as desirable for sludge drying in Dryer 2 and/or to produce power from the steam system/turbine 18. Additionally, the dual fuel burner 10 may be able to supply up to 100% of the heat required using either biofuel or supplementary fuel 26 alone. In some examples, dual fuel burner 10 may include separate ignition systems (not shown), which may be fired by biofuel, oil, or gas. In some examples, the separate ignition burner may be used to maintain the system temperature in a stand-by mode during times when sludge is not being processed or power production is not desired.

The steam to power steam system/turbine 18 circulates through turbine air-water heat exchanger 35 located with system boiler 11 where heat is transferred from the combustion of biofuel to the steam. The heat available to produce steam for the steam system/turbine 18 is heat remaining after sufficient heat is conveyed to the drying gas stream via air-air boiler heat exchanger 12.

The dual fuel burner 10 may be supplied with biofuel and air drawn through a combustion supply fan 9. In some examples, combustion supply fan 9 draws ambient-temperature and/or pre-heated air 38 from the atmosphere and the reduced-temperature diverted portion of cleaned drying gas stream exiting condenser 14. In some embodiments of treatment system 100, a fuel venturi 19 may include a venturi valve arranged to further mix the ambient-temperature and/or pre-heated air 38 and the reduced-temperature diverted portion of cleaned drying gas stream exiting condenser 14 from primary air supply inlet 20 with biofuel from biofuel bin 6. Primary air supply inlet 20 may include an air-air heat exchanger system (not shown) to preheat the air being used with the biofuel, as well as a filter and grill fitted with an integral adjustable baffle (not shown) to control downstream pressure and minimize dust drawn to dual fuel burner 10. The combustion supply fan 9 may include a dust handling fan and may supply the dual fuel burner 10 with the mix of ambient temperature and preheated air, and biofuel. In some examples, combustion supply fan 9 may include a variable speed drive to control the airflow to dual fuel burner 10 or, alternately, ambient-temperature or preheated air from the primary air supply inlet 20 may provide all of the air to the dual fuel burner 10.

In some examples, the weight of ambient-temperature or preheated air (i.e. new air) that enters dual fuel burner 10 through primary air supply inlet 20 may be equal to approximately three to ten times that the weight of air from diverter valve 17 entering dual fuel burner 10.

Treatment system 100 may further include ash separator 22 for receiving the combusted air exiting from the system boiler 11. The received combusted air may include ash along with some residual moisture from system boiler 11. Ash separator 22 may be used to remove ash from the combusted air exiting from system boiler 11 and deposit the removed ash in ash storage bin 21 or ash storage 23. In some examples, ash separator 22 may include a Stairmand-type high-efficiency cyclone or a fabric-type separator to clean the gas received from system boiler 11. Specifically, one or more separators, each made from temperature and corrosion-resistant materials (e.g., stainless steel), may be used to separate the particles from the combusted air exiting from system boiler 11 and may discharge the solids to ash storage bin 21 or ash storage 23. The cleaned combusted air exiting ash separator 22 may then be sent to terminal air pollution control scrubber 24. While the above examples were described using Stairmand-type cyclones, other cyclone separators, a baghouse, or other gas solids separators capable of functioning effectively and safely in the operating temperatures may be used to clean the combusted air exhaust from the system boiler 11. It should be appreciated that the air pollution control scrubber may have additional functions depending on applicable air quality standards.

The cleaned combusted air exiting ash separator 22 can be directed to terminal air pollution control scrubber 24. Terminal air pollution control scrubber 24 may be of a type similar or identical to condensing-type scrubber 7 and may be used to condense moisture out of the cleaned combusted air received from ash separator 22. For instance, terminal air pollution control scrubber 24 may direct the cleaned combusted air received from ash separator 22 over a series of tubes that are cooled by the flow of water from an ambient-temperature water source, causing the gas temperature to drop below its dew point. As the moisture condenses into water at air pollution control scrubber 24, it may collect carry-over particulate remaining in the gas stream and carry the particulate as sludge condensate which is to be removed from the system and conveyed to the treatment plant headworks or other disposal site (not shown).

Treatment system 100 may further include a terminal fan 43 for drawing the cleaned combusted air through the ash separator 22 and air pollution control scrubber 24. The output of terminal fan 43 may be discharged from the system through the discharge stack 34 after the air pollution control scrubber 24 and then to the atmosphere.

In some examples, the weight of gas that enters treatment system 100 from the atmosphere through primary air supply inlet 20 may be equal to the weight of gas that is removed from the system though the discharge stack 34 to the atmosphere. As a result, a constant weight of gas circulating through the system may be maintained.

Figure 2:
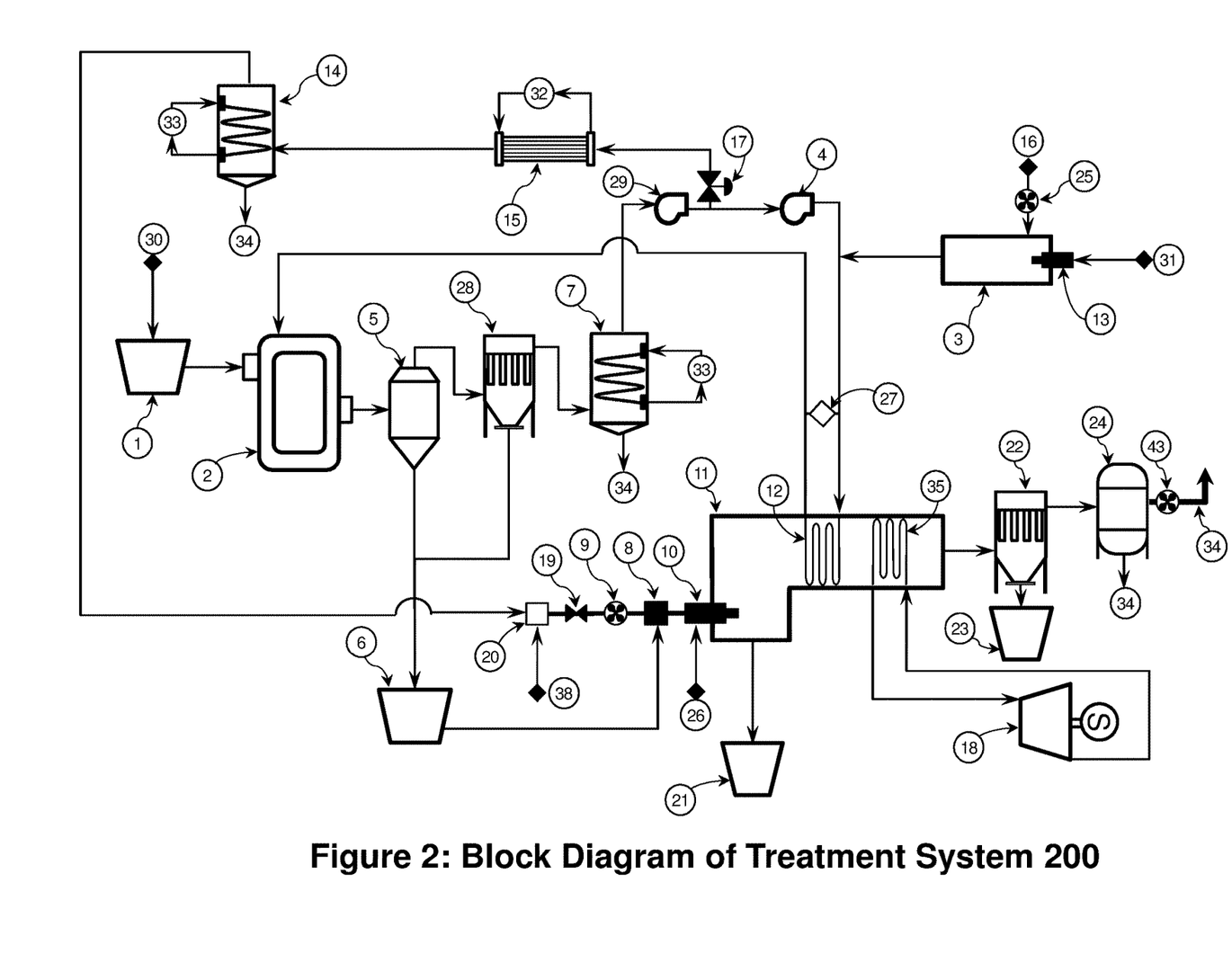
FIG. 2 illustrates a block diagram of another exemplary system for transforming sludge into energy.

FIG. 2 illustrates a block diagram of another exemplary treatment system 200. Treatment system 200 is similar to treatment system 100, with the differences discussed in greater detail below. Reference numbers for components of treatment system 200 that are the same as those used for components in treatment system 100 indicate that a similar component may be used in treatment system 200.

Treatment system 200 may be utilized when a supply of digester gas is available to preheat make-up air supply 16. In treatment system 200, dryer heater 3 is added to the system described in treatment system 100 and is the primary source of heat for the drying gas stream. As a result, in treatment system 200, heat conveyed to the drying gas stream from the air-air boiler heat exchanger 12, located within system boiler 11 is minimized and the heat directed to the turbine air-water heat exchanger 35 is maximized. With more heat supplied to the steam system/turbine 18, the production of power is increased in comparison to treatment system 100.

It should be appreciated that, as with treatment system 100, the operating temperature of the drying gas at Dryer 2 in treatment system 200 may vary depending on the specific sludge application. Increasing the temperature of the drying gas stream in Dryer 2 enables increased moisture pickup per unit weight of sludge 30. As a result, the throughput of Dryer 2 for dewatered sludge of any particular moisture content may be increased in proportion to heat input to the Dryer 2. The drying gas stream can be at a temperature between 600° F. and 1,500° F. Sources of heat for drying gas stream coming to Dryer 2 may include an air-air boiler heat exchanger unit 12 within system boiler 11 that will supplement heat produced from digester gas 31 combusted in digester gas burner 13.

In dryer heater 3, digester gas 31 combusted in digester gas burner 13 preheats make-up air supply 16. The make-up air supply 16 may include air supply fan 25 to assist the air flow into dryer heater 3. Preheated make-up air supply 16 is then injected into the drying gas loop. It should be appreciated that preheated make-up air supply 16 may be injected into the drying gas loop either before or after air-air boiler heat exchanger unit 12 within system boiler 11.

Figure 3:
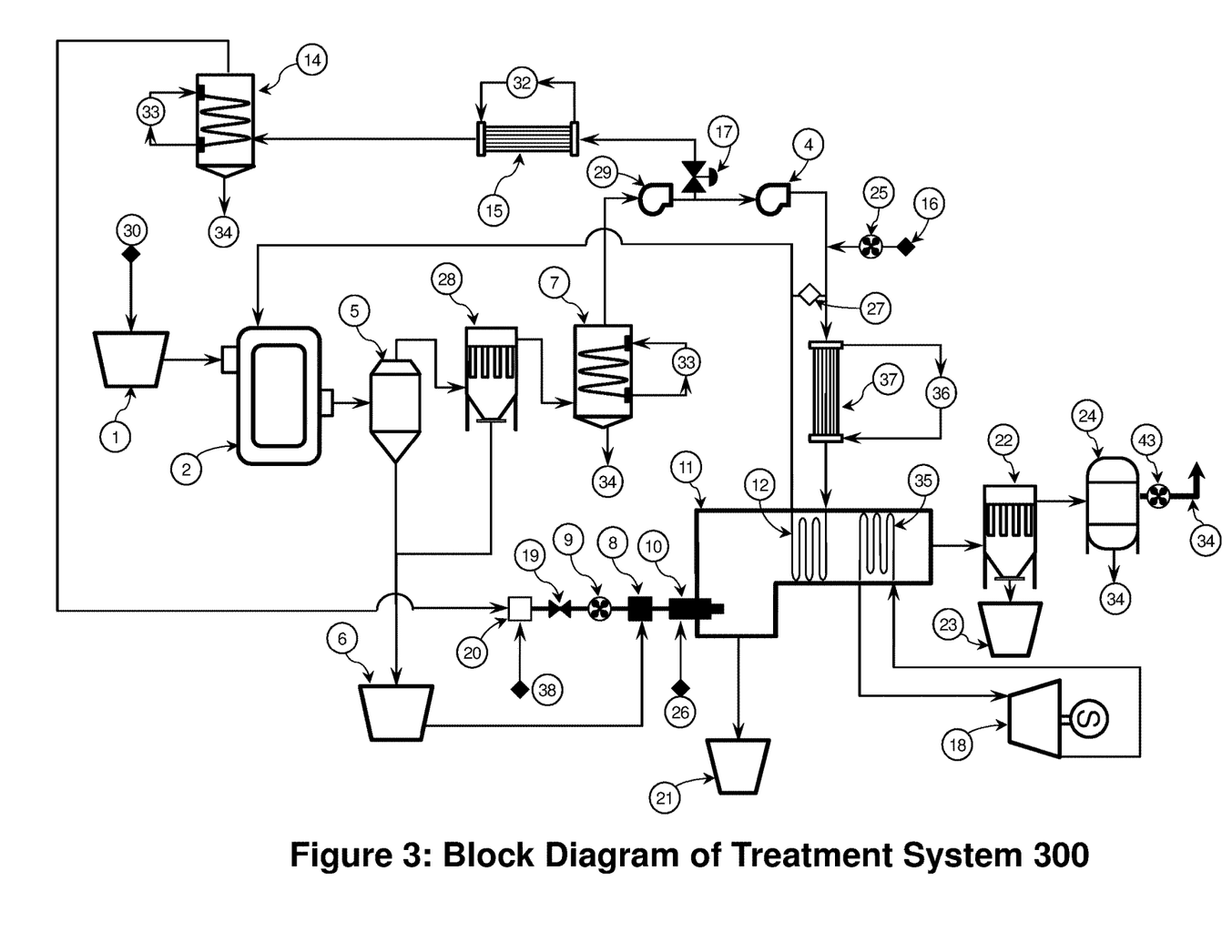
FIG. 3 illustrates a block diagram of another exemplary system for transforming sludge into energy.

FIG. 3 illustrates a block diagram of another exemplary treatment system 300. Treatment system 300 may be similar to treatment system 100, with the differences discussed in greater detail below. Reference numbers for components of treatment system 300 that are the same as those used for components in treatment system 100 indicate that a similar component may be used in treatment system 300.

Treatment system 300 may be utilized when a supply of high temperature exhaust air from power generation equipment (not shown) is available to support Dryer 2. In treatment system 300, air-air heat exchanger 37 is added to the system described in treatment system 100 to preheat the portion of cleaned drying gas going to air-air boiler heat exchanger 12 that was not drawn through diverter valve 17 and not divert by mixer 27 by transferring heat from the high temperature power generation equipment exhaust system to the now cleaned drying gas stream. As a result, in treatment system 300, because drying gas conveyed to air-air boiler heat exchanger 12, located within system boiler 11 has been preheated using high temperature power generation equipment exhaust air via air-air heat exchanger 37 heat available for turbine air water heat exchanger 35 is maximized. With more heat supplied to the steam system/turbine 18, the production of power is increased in comparison to treatment system 100.

Treatment system 300 is based on treatment system 100 with the addition of exhaust air manifold line 36 that runs from power generation equipment (not shown) and delivers heated power generation equipment exhaust air to the air-air heat exchanger 37, to preheat the recirculating drying gas in advance of air-air boiler heat exchanger 12. After passing through the air-air heat exchanger 37, the exhaust air manifold line 36 delivers the reduced temperature power generation equipment exhaust air to the appropriate power generation air pollution control equipment (not shown) before it is released to the atmosphere.

It should be appreciated that in addition to the described exemplary systems 100, 200, and 300 described, additional systems are possible including variations and combinations of the elements and systems provided. For example, certain elements may be optionally removed or replaced, additional elements may be included, and certain elements described with respect to one system may be advantageously used in other systems described. For example, condensing-type scrubber 7 may be removed or additional mixers 39 may be added.

Figure 4:
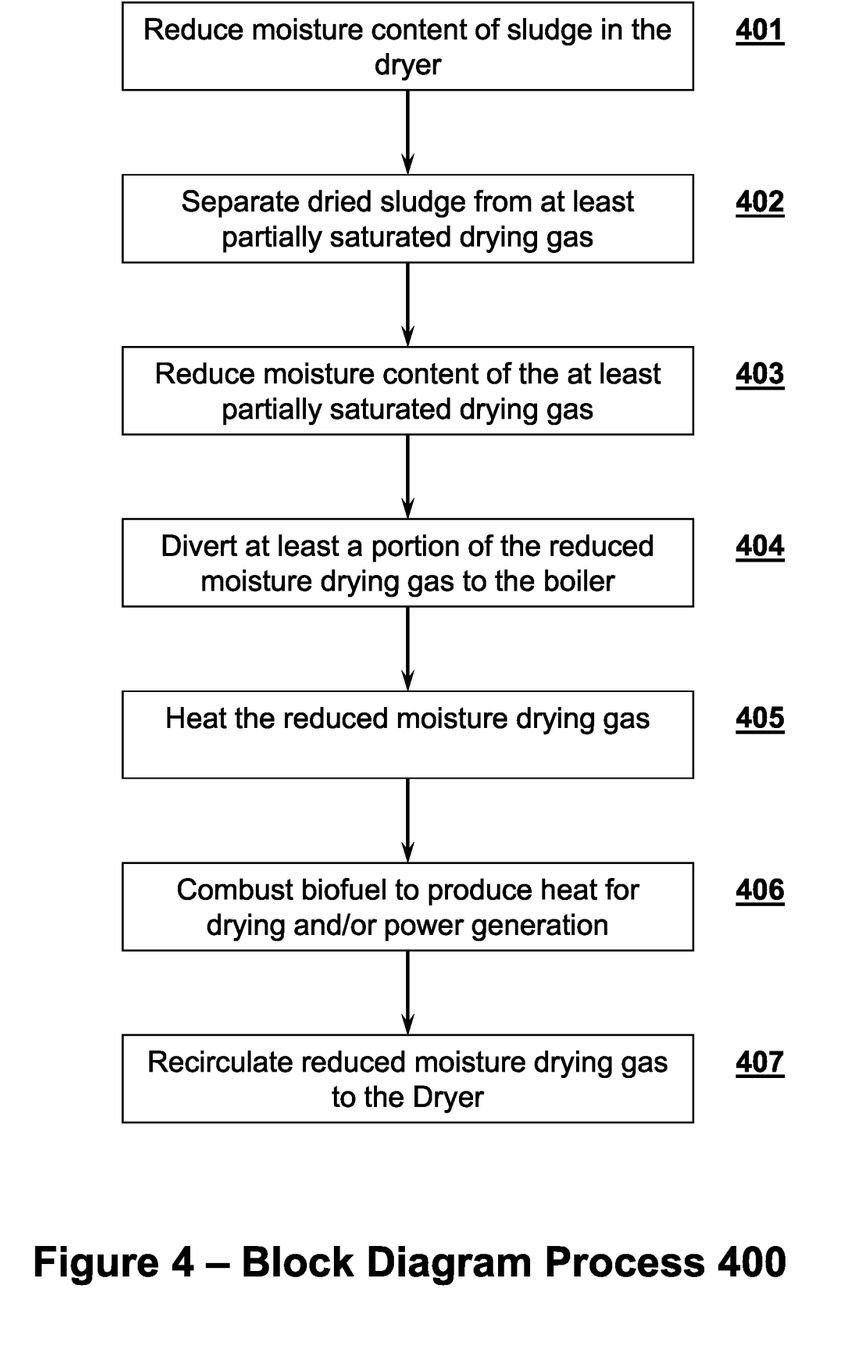
FIG. 4 illustrates an exemplary process block diagram.

FIG. 4 illustrates an exemplary process 400 for transforming sludge into energy. In some examples, process 400 can be performed using a treatment system similar or identical to treatment system 100, 200 or 300.

At block 401, moisture content of dewatered sludge may be reduced to form at least partially saturated drying gas and biofuel with a moisture content of less than 30 percent. In some examples, this may be done using Dryer 2 as described above. For instance, dewatered sludge may be broken up in the presence of drying gas to form a powder having a moisture content of less than about 30 percent. The drying gas may absorb at least a portion of the moisture contained in the dewatered sludge. In some examples, the dewatered sludge may be heated at Dryer 2, using, for example, drying gas received from dryer heater 3 and/or air-air boiler heat exchanger unit 12 via process-air circulation fan 4 and/or process fan 29.

At block 402, the biofuel may be separated from the at least partially saturated drying gas generated at block 401. In some examples, this may be done using gas-solids separators 5 and 28 as described above. For instance, gas-solids separators 5 and 28 may be operable to separate the biofuel from the at least partially saturated drying gas generated by Dryer 2 and deposit the separated biofuel into biofuel bin 6. In some examples, gas-solids separator 5 may be a cellular type separator and may include one or more Stairmand-type cyclones or other satisfactory equipment to clean the received at least partially saturated gas.

At block 403, the moisture content of the at least partially saturated drying gas may be reduced by reducing the temperature of the at least partially saturated drying gas to below its dew point to form a reduced-moisture gas (i.e., cleaned drying gas) and hot water. In some examples, the moisture content of the at least partially saturated drying gas is reduced using condensing-type scrubber 7 to form cleaned drying gas as described above. For instance, the at least partially saturated gas may be passed through a series of tubes that are cooled by ambient-temperature water received from an outside source. As the at least partially saturated drying gas cools below the dew point of the gas moisture, a portion of the moisture condenses out of the gas. As the moisture condenses into water, it may collect carry-over particulate remaining from the drying gas stream and carry the particulate to the treatment plant or other out-of-system treatment 34.

At block 404 a portion of the reduced-moisture drying gas generated at block 403 may be diverted to compensate for moisture contained in sludge entering the system 30. The moisture content of the diverted drying gas stream may be reduced at condenser 14. The reduced-moisture diverted gas stream (i.e., reduced-temperature diverted portion of cleaned drying gas stream described above) is then conveyed to the primary air inlet 20 where it is combined with ambient-temperature and/or pre-heated air 38 to be the oxygen source for the fuel burner 10.

At block 405, heating of the reduced-moisture drying gas generated at block 403 may be accomplished in air-air boiler heat exchanger 12 in system boiler 11. In some examples, based on treatment system 200, the reduced-moisture drying gas is also heated in dryer heater 3 with heat produced by combusting digester gas 31 in digester gas burner 13. In some examples, based on treatment system 300, the reduced-moisture drying gas is preheated using power generation equipment exhaust gas via air-air boiler heat exchanger 37 before it is heated via air-air boiler heat exchanger 12 in the system boiler 11.

At block 406, biofuel is combusted in system boiler 11 and produces heat for the drying gas that is utilized in Dryer 2 and heats the steam circulating through air-water heat exchanger 35 that powers steam system/turbine 18.

At block 407, the reduced-moisture drying gas is then recirculated to Dryer 2 to reduce the moisture content of the sludge 30.

It should be appreciated that while the blocks of process 400 are provided in a particular order, the blocks can be performed in other orders, and some processes may be carried out partially or fully in parallel. Further, process 400 can include all or a portion of the blocks listed above.

Those skilled in the art will recognize that the operations of some variations may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art, to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the apparatus and methods described herein.

Figure 5:
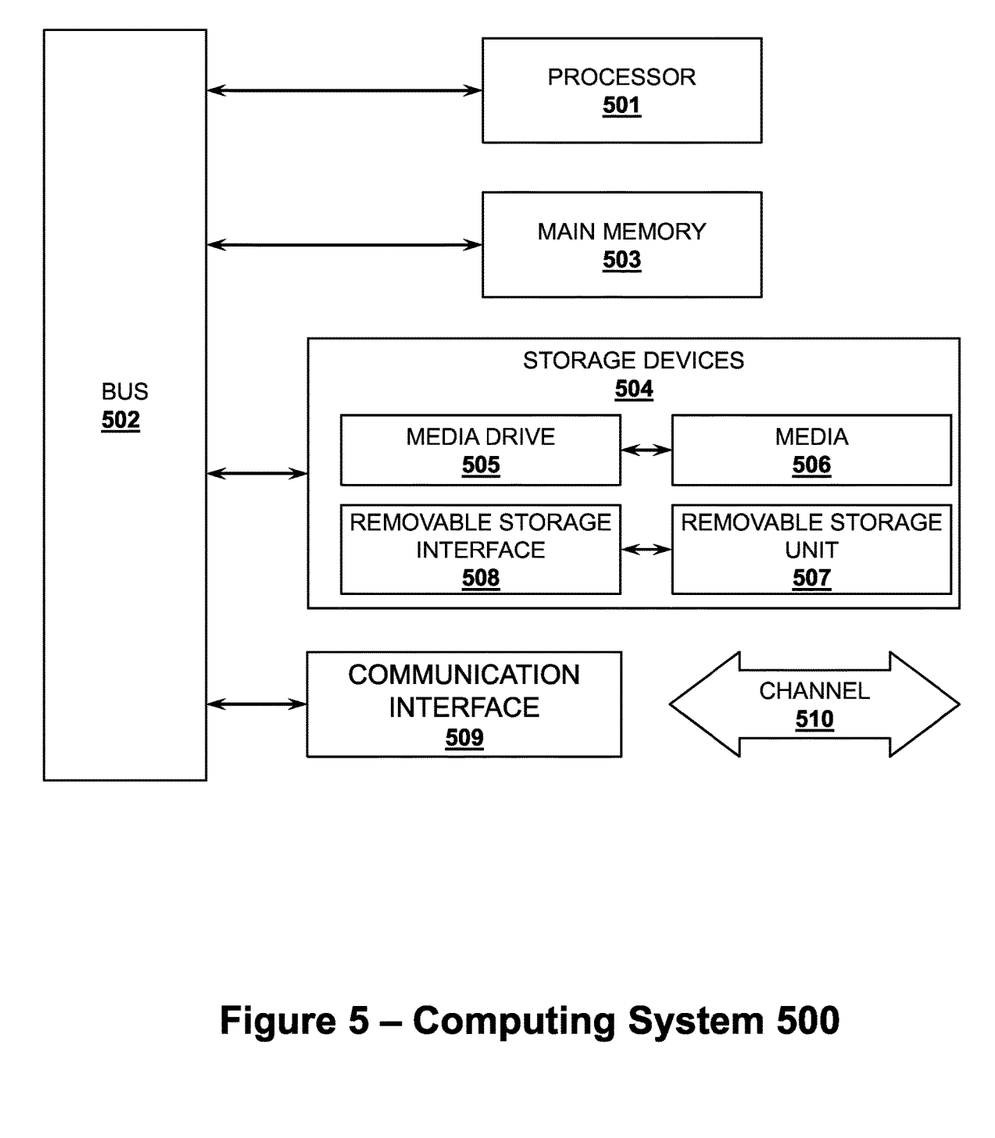
FIG. 5 illustrates an exemplary computing system that may be used to control a sludge treatment system.

FIG. 5 illustrates a typical computing system 500 that may be employed to carry out processing functionality in some variations of the process. For instance, computer system 500 may be used to control one or more elements of the exemplary treatment systems described above. Those skilled in the relevant art will also recognize how to implement the apparatus and methods described herein using other computer systems or architectures. Computing system 500 may represent, for example, a desktop, laptop, or notebook computer, hand-held computing device (PDA, mobile phone, tablet, etc.), mainframe, supercomputer, server, client, or any other type of special or general purpose computing device as may be desirable or appropriate for a given application or environment. Computing system 500 can include one or more processors, such as a processor 501. Processor 501 can be implemented using a general or special purpose processing engine such as, for example, a programmable logic controller, a microprocessor, controller, or other control logic. In this example, processor 501 is connected to a bus 502 or other communication medium.

Computing system 500 can also include a main memory 503, preferably random access memory (RAM) or other dynamic memory, for storing information and instructions to be executed by processor 501. Main memory 503 also may be used for storing temporary variables or other intermediate information during execution of instructions to be executed by processor 501. Computing system 500 may likewise include a read-only memory or other static storage device coupled to bus 502 for storing static information and instructions for processor 501.

The computing system 500 may also include information storage Devices 504, which may include, for example, a media drive 505. The media drive 505 may include a drive or other mechanism to support fixed or removable storage media, such as a hard disk drive, a floppy disk drive, a USB flash drive, an optical disk drive, a CD or DVD drive (R or RW), or other removable or fixed media drive. Storage media 506 may include, for example, a hard disk, floppy disk, optical disk, CD or DVD, or other fixed or removable medium that is read by and written to media drive 505. As these examples illustrate, the storage media 506 may include a computer-readable storage medium having stored there in particular computer software or data.

In some variations, information storage Devices 504 may include other similar instrumentalities for allowing computer programs or other instructions or data to be loaded into computing system 500. Such instrumentalities may include, for example, a removable storage unit 507 and an interface 508, such as a program cartridge and cartridge interface, a removable memory (for example, a flash memory or other removable memory module) and memory slot, and other removable storage units 507 and interfaces 508 that allow software and data to be transferred to computing system 500.

In some variations, computing system 500 can also include a communications interface 509. Communications interface 509 can be used to allow software and data to be transferred between computing system 500 and external devices. Non-limiting examples of communications interface 509 can include a modem, a network interface (such as an Ethernet or other NIC card), a communications port (such as for example, a USB port), a PCMCIA slot and card, a PCI interface, etc. Software and data transferred via communications interface 509 are in the form of signals which can be electronic, electromagnetic, optical, or other signals capable of being received by communications interface 509. These signals are provided to communications interface 509 via a channel 510. This channel 510 may carry signals (e.g., signals to and from sensors or controllers) and may be implemented using a wireless medium, wire or cable, fiber optics, or other communications medium. Some examples of a channel include a phone line, a cellular phone link, an RF link, a network interface, a local or wide area network, and other communications channels.

The terms "computer program product" and "computer-readable storage medium" may be used generally to refer to non-transitory storage media, such as, for example, main memory 503 and storage devices 504. These and other forms of computer-readable storage media may be involved in providing one or more sequences of one or more instructions to processor 501 for execution. Such instructions, generally referred to as "computer program code" (which may be grouped in the form of computer programs or other groupings), when executed, enable the computing system 500 to perform features or functions of embodiments of the apparatus and methods, described herein.

In some variations where the elements are implemented using software, the software may be stored in a computer-readable storage medium and loaded into computing system 500 using, for example, removable storage drive 507 or communications interface 509. The control logic (in this example, software instructions or computer program code), when executed by the processor 501, causes the processor 501 to perform the functions of the apparatus and methods, described herein.

It will be appreciated that, for clarity purposes, the above description has described embodiments of the apparatus and methods described herein with reference to different functional units and processors. However, it will be apparent that any suitable distribution of functionality between different functional units, processors, or domains may be used without detracting from the apparatus and methods described herein. For example, functionality illustrated to be performed by separate processors or controllers may be performed by the same processor or controller. Hence, references to specific functional units are only to be seen as references to suitable means for providing the described functionality, rather than as indicative of a strict logical or physical structure or organization.

While specific components and configurations are provided above, it will be appreciated by one of ordinary skill in the art that other components variations may be used. Additionally, although a feature may appear to be described in connection with a particular embodiment, one skilled in the art would recognize that various features of the described embodiments may be combined. Moreover, aspects described in connection with an embodiment may stand alone.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A system for generating electricity by combusting biofuel produced from dewatered sludge, the system comprising:
    a turbine;
    a dryer operable to:
        receive a drying gas;
        receive sludge; and
        reduce the moisture content of the sludge in the presence of the drying gas, wherein the drying gas absorbs at least a portion of the moisture content of the sludge and forms a biofuel, reduced moisture powder, and at least partially saturated gas;
    a boiler system comprising a dual fuel burner and a primary air supply inlet, the boiler system operable to receive and combust the biofuel to produce at least one of heat for use in the dryer or steam for the turbine;
    a first separator located downstream of the dryer operable to separate the biofuel from the at least partially saturated gas;
    a first condenser located downstream of the separator operable to reduce a moisture content of the at least partially saturated gas by reducing a temperature of the at least partially saturated gas to form a reduced-moisture gas;
    at least one fan located downstream of the condenser operable to direct the reduced-moisture gas to a heat exchanger to form the drying gas, the heat exchanger disposed in the boiler system and to direct the reduced-moisture gas to the dryer to reduce the moisture content of the sludge;
    a diverter valve located downstream of the fan operable to keep an overall system moisture balance by removing the volume of reduced-moisture gas out of the system that is equivalent to the volume of moisture removed from the sludge less the amount removed by first condenser;
    a gas-water heat exchanger located downstream of the diverter valve for cooling the reduced-moisture gas diverted out by the diverter valve by using process water from an ambient-temperature water source and a condenser located downstream of the gas-water heat exchanger for condensing out a volume of moisture equal to the moisture contained in the sludge less the amount removed by the first condenser from the diverted reduced-moisture gas volume, to form a reduced temperature diverted portion of cleaned drying gas;
    the boiler system comprising the primary air supply inlet further operable to receive the reduced temperature diverted portion of cleaned drying gas as combustion air being combusted with the biofuel utilizing the dual fuel burner;
    a make-up air supply located downstream of the fan to replace reduced-moisture gas diverted out of the system; and
    a series of heat exchangers incorporated into the boiler system to transfer heat to at least one of the turbine and dryer.

2. The system of claim 1, further comprising a mixer operable to mix a second portion of reduced-moisture gas with gas heated by the boiler to form the drying gas.

3. The system of claim 2, wherein the dual fuel burner is further operable to burn a mixture of at least one of ambient and pre-heated air and at least a portion of the reduced moisture powder.

4. The system of claim 2, wherein the burner is further operable to burn a gas or oil.

5. The system of claim 1, wherein the dual fuel burner is operable to further heat the drying gas heated by the boiler system.

6. The system of claim 1, wherein the reduced-moisture gas is preheated using heat from combusted gas before it is heated in the boiler system.

7. A method for producing electricity from dewatered sludge in a treatment system, the system comprising a turbine, a dryer, a boiler system comprising a dual fuel burner and a primary air supply inlet, a first separator located downstream of the dryer, a first condenser located downstream of the separator, at least one fan located downstream of the condenser, a diverter valve located downstream of the fan, a gas-water heat exchanger located downstream of the diverter valve, a make-up air supply located downstream of the fan, and a series of heat exchangers incorporated into the boiler system, the method comprising:
    reducing moisture content of a dewatered sludge in the dryer by breaking the dewatered sludge into biofuel in the presence of a drying gas, wherein the drying gas is at least 600° F., and the drying gas absorbs at least a portion of the moisture content of the dewatered sludge to form at least partially saturated gas;
    combusting the biofuel, in the boiler system, to produce at least one of a drying gas for use in the drying process and steam for use in a turbine;
    separating, in the first separator, the biofuel from the at least partially saturated gas;
    reducing, in the first condenser, a moisture content of the at least partially saturated gas by reducing a temperature of the at least partially saturated gas to below its dew point in order to form a reduced-moisture gas;
    heating a portion of the reduced-moisture gas in the boiler system to generate the drying gas; and
    recirculating at least a portion of the drying gas by directing it to the dryer, wherein upon exiting the dryer it becomes partially saturated gas.

8. The method of claim 7, wherein the dual fuel burner of the boiler system is used to combust the biofuel and the boiler system heats the drying gas.

9. The method of claim 8, wherein the drying gas is heated by a heater burning gas and the boiler system.

10. The method of claim 7, wherein reducing the moisture content of the at least partially saturated gas is performed using the condenser which is operable to receive water at a first temperature and output the water at a second temperature higher than the first temperature, and wherein the water reduces the temperature of the at least partially saturated gas.

11. The method of claim 7, wherein combusting the fuel produces combusted gas having ash and a moisture content, and further comprising:
  reducing the moisture content of the combusted gas using a second condenser, the second condenser operable to receive water at a first temperature and output the water at a second temperature higher than the first temperature, and wherein the water reduces the temperature of the combusted gas;
  discharging the reduced moisture combusted gas; and
  separating the ash from the combusted gas.

* * * * *